: US 6,311,496 B1
(45) Date of Patent: Nov. 6, 2001

(12) United States Patent
Alkabie

(54) GAS TURBINE FUEL/AIR MIXING ARRANGEMENT WITH OUTER AND INNER RADIAL INFLOW SWIRLERS

(75) Inventor: Hisham Salman Alkabie, Sudbrooke (GB)

(73) Assignee: Alstom Gas Turbines Limited (GB)

( * ) Notice: Subject to any disclaimer, the term of this patent is extended or adjusted under 35 U.S.C. 154(b) by 0 days.

(21) Appl. No.: 09/213,339

(22) Filed: Dec. 17, 1998

(30) Foreign Application Priority Data

Dec. 19, 1997 (GB) .................................................. 9726847

(51) Int. Cl.[7] ........................................................ F23R 3/14
(52) U.S. Cl. ............................. 60/748; 60/737; 239/402; 239/404
(58) Field of Search ..................... 60/748, 737; 239/404, 239/402; 431/9

(56) References Cited

U.S. PATENT DOCUMENTS

| 3,570,242 | * | 3/1971 | Leonardi et al. ....................... 60/748 |
| 3,605,405 | | 9/1971 | DuBell, et al. . |
| 3,917,173 | * | 11/1975 | Singh ..................................... 239/400 |
| 4,400,151 | * | 8/1983 | Vatsky ................................... 431/184 |
| 4,854,127 | * | 8/1989 | Vinson et al. .......................... 60/742 |
| 5,062,792 | * | 11/1991 | Maghon ................................. 60/748 |
| 5,435,126 | | 7/1995 | Beaudoin . |
| 5,450,724 | | 9/1995 | Kesseli et al. ......................... 60/748 |
| 5,657,632 | * | 8/1997 | Foss ....................................... 60/742 |

FOREIGN PATENT DOCUMENTS

| WO 96/02796 | 2/1996 | (EP) . |
| 0 722 065 A2 | 7/1996 | (EP) . |
| 0 728 989 A2 | 8/1996 | (EP) . |
| 826 961 | 3/1957 | (GB) . |
| 1 489 496 | 10/1977 | (GB) . |
| 2 297 151 | 7/1996 | (GB) . |
| 2 321 304 A | 7/1998 | (GB) . |

* cited by examiner

*Primary Examiner*—Ted Kim
(74) *Attorney, Agent, or Firm*—Kirschstein, et al.

(57) ABSTRACT

A fuel/air mixing arrangement for a combustion apparatus such as a gas turbine comprises a first swirler in which air and fuel are mixed to form a fuel/air mixture, a first conduit to supply a first proportion of the mixture to the combustion apparatus, a second swirler arranged to receive a second proportion of the mixture, and a second conduit to supply the second proportion from the second swirler to the combustion apparatus.

8 Claims, 4 Drawing Sheets

PRIOR ART Fig.1.
PRIOR ART Fig.2.
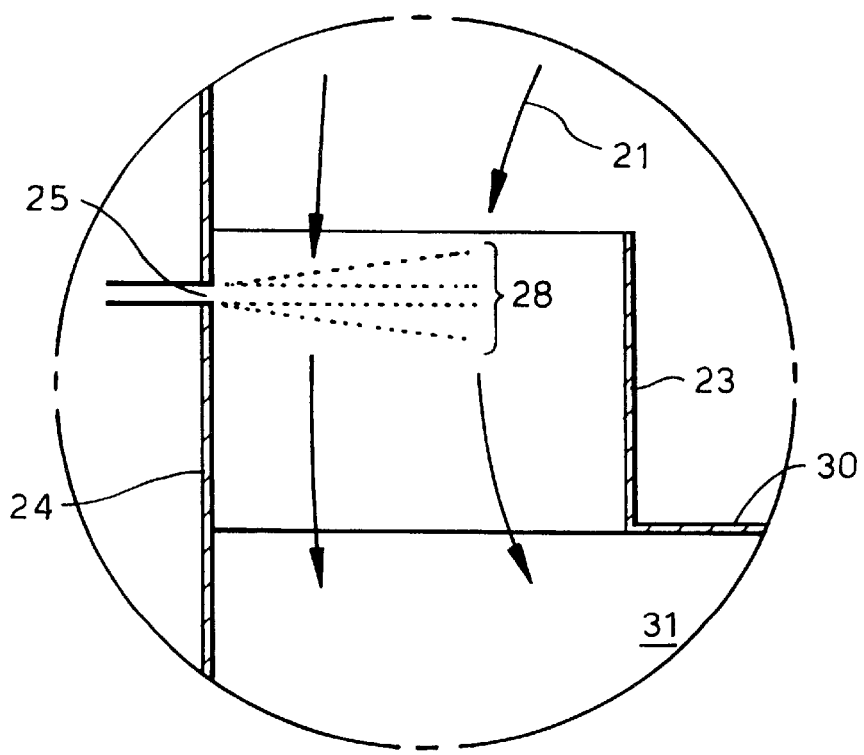

GAS TURBINE FUEL/AIR MIXING ARRANGEMENT WITH OUTER AND INNER RADIAL INFLOW SWIRLERS

BACKGROUND OF THE INVENTION

This invention relates to a fuel/air mixing arrangement of the radial inflow type for combustion apparatus such as burners in gas turbine engines. It has a particular applicability to gas-fueled gas turbines.

Both efficiency and environmental considerations mean that it has become essential to ensure that the levels of pollutant emission from combustion apparatus are kept as low as possible and various measures have been proposed with that aim in mind. For example, in the field of gas turbine engines, 'lean-burn' combustion systems are well-known. In such systems, the air/fuel ratio is at or near stochiometric and, specifically when the engine is running at or near full load, harmful exhaust pollutants, specifically CO, $NO_x$ and unburnt hydrocarbons are produced in relatively small amounts. However, at lower loads, known lean-burn configurations may not be so advantageous and, inter alia, difficulty may be experienced in maintaining flame stability to the extent that flame-out may occur due to the weak fuel content and the low velocity of the mixture.

Past proposals for overcoming such problems have generally utilized complicated arrangements for adjusting the operation of the engine to improve low-load performance. Inter alia, there have been proposed fuel staging arrangements whereby fuel is injected in stages depending on the load under which the engine is operating, with additional stages being brought into operation as the engine load increases. In other arrangements, a pilot flame is maintained by injecting fuel directly and axially into the center of a swirler to give a fuel-rich central zone with improved flame stability. However, pilot flame systems usually give higher levels of pollution when operating at low load. All these various arrangements can involve fairly complicated control systems for ensuring the right amount of fuel is being injected at the right time and to the right place.

SUMMARY OF THE INVENTION

The present invention aims to provide a simple, effective fuel/air mixing arrangement of the radial inflow type which adapts to the rate at which fuel is injected to ensure efficient combustion and low levels of harmful exhaust pollutants.

According to one aspect of the invention, there is provided a fuel/air mixing arrangement for a combustion apparatus comprising a mixing means wherein air and fuel are mixed to form a fuel/air mixture, a first conduit means whereby a first proportion of said fuel/air mixture is supplied from said mixing means to said combustion apparatus, a flow division means arranged to receive a second proportion of said fuel/air mixture from said mixing means, and a second conduit means to supply said second proportion from said flow division means to said combustion apparatus.

Preferably the mixing means comprises a primary swirler means. Preferably the flow division means comprises a secondary swirler means.

According to a further aspect the invention provides a fuel/air mixing arrangement for a combustion apparatus comprising a primary swirler means in which air and fuel are mixed to form a fuel/air mixture, a first conduit means to supply a first proportion of said mixture from said primary swirler means to said combustion apparatus, a secondary swirler means arranged to receive a second proportion of said mixture, and a second conduit means to supply said second proportion from said secondary swirler means to said combustion apparatus.

The primary swirler means preferably comprises a plurality of vanes defining passages there between arranged to produce a flow of said mixture there through, said flow having a radially directed component. The secondary swirler means preferably comprises a plurality of vanes defining passages there between arranged to produce a flow of said second proportion there through, said flow having a radially directed component.

Each passage of said primary swirler means preferably has at least one fuel injection orifice associated therewith for the supply of fuel to said passage. Shield means may be provided to shield the fuel injection orifice(s) from air flow entering the passages of the primary swirler means.

The arrangement may operate such that as the rate at which fuel enters the mixing means increases, the first proportion increases, or such that as the rate at which fuel enters the first swirler means increases, the first proportion increases.

The second conduit means may comprise a tube whose upstream end is integral with or attached to the secondary swirler means.

The secondary swirler means may be situated radially inward of the primary swirler means.

The secondary swirler means may have a smaller effective volume than that of the primary swirler means.

BRIEF DESCRIPTION OF THE DRAWINGS

Embodiments of the invention are described by way of example only with reference to the accompanying drawings in which:

FIG. 1 shows a combustor of a gas turbine comprising a conventional fuel/air mixing arrangement associated with a combustion chamber;

FIG. 2 shows detail (A) on FIG. 1, being a diagrammatic enlarged view of part of the swirler of the mixing arrangement with representations of the supply of air, the injection of fuel and the mixing thereof with air in the swirler;

DETAILED DESCRIPTION OF THE PREFERRED EMBODIMENTS

Figure 3:
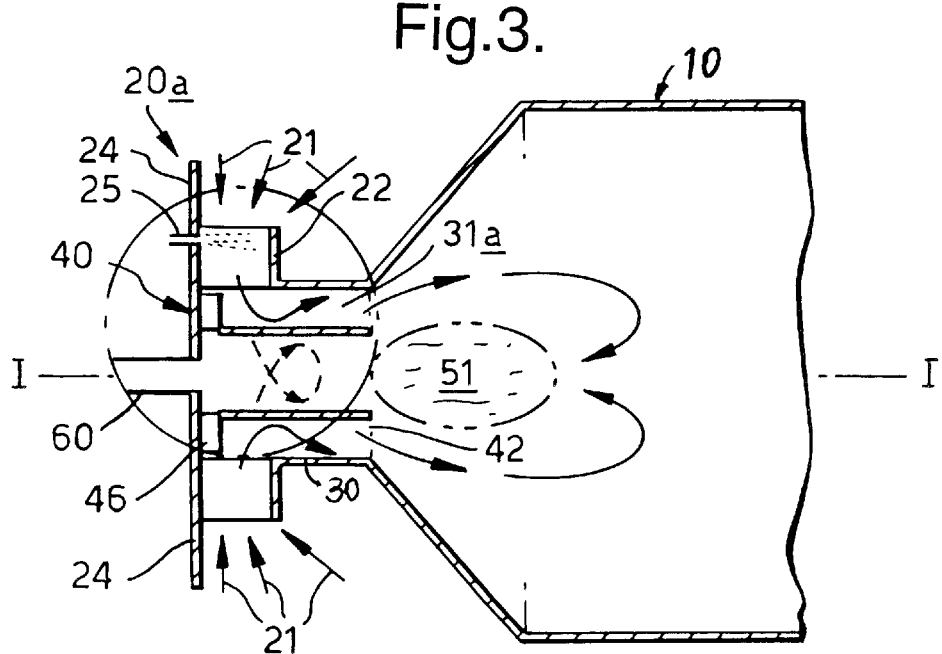
FIG. 3 is a diagrammatic axial view of a combustor comprising a fuel/air mixing arrangement according to an embodiment of the invention and the upstream end of a combustion chamber of a gas turbine.

As seen in FIG. 1 the combustor 1 comprises a combustion chamber 10 and a fuel/air mixing arrangement 20.

The combustor 1 of FIG. 1 has a central longitudinal axis I—I; the combustor may be one of plurality of such combustors of a gas turbine assembly, e.g., arranged in an annular array.

FIG. 1 shows an upstream portion of the combustion chamber 10, such chamber being defined by a cylindrical wall 11 and a wall 12 which tapers in a direction from the upstream end of wall 11 i.e. from the left hand end of wall 11 as seen in FIG. 1. The smaller-diameter end of tapering wall 12 connects with a cylindrical wall 30 of a conventional fuel/air mixing arrangement 20 which is situated at the upstream end of the combustion chamber 10 and which comprises a mixing means in the form of a swirler 22 and a (first) conduit means in the form of pre-combustion chamber 31. Fuel and air are mixed in arrangement 20 to provide a combustible mixture to be burnt in the combustion chamber 10. The air supply to the mixing arrangement 20 is diagrammatically indicated by arrows 21; such air supply is typically provided from a compressor driven by the turbine. The air from the compressor flows over the outer surface of the wall 11, conventionally in a passage which surrounds wall 11 and cools the wall 11 as it flows there along. The air enters the mixing arrangement 20 through the radially outer ends of passages in the swirler 22. The swirler 22 comprises a circumferential array of vanes or blades 26 arranged between a wall 23 extending radially outwardly from the wall 30 and an end wall 24. The vanes 26 have passages there between which passages are angled such that air enters them generally tangentially and flows there through with a swirling motion having a radially inward component of motion. The vanes 26 may be formed as separate components affixed in place or the passages may be milled or drilled out from a thick walled tubular component to form the vanes. The wall 24 is formed with a plurality of fuel injection orifices or nozzles 25, typically one for each passage, the injection orifices 25 being arranged towards the radially outer ends of the passages. The fuel is injected to give a diverging flow pattern as illustrated at 28 (see FIG. 2). The end wall 24 may have an electric spark igniter unit (not shown) extending therefrom.

Air passing through the passages in the swirler 22 from the region surrounding the swirler 22 mixes with fuel injected through orifices 25 and the fuel/air mixture thus formed enters the conduit means represented by the pre-chamber 31. The swirling air/fuel mixture as represented by arrows 32 in pre-chamber 31 passes from the pre-chamber 31 into the main combustion chamber 10 where it is burnt. Numeral 13 on FIG. 1 represents the flame zone with numeral 14 representing the boundary of the flame when the engine is operating at full or near-to-full load.

This conventional arrangement operates satisfactorily under such full load conditions but as the engine load falls and the fuel supply is reduced, the size of flame 13 decreases and the amount of pollutants, e.g., CO, is increased and with 'lean-burn' conditions maintained the risk of flame-out is markedly increased. It is to be understood that in operation of the mixing arrangement, motion of the air, fuel and air fuel mixture through the swirler passages and the pre-chamber is complex; inter alia, there exists a velocity gradient having radial and axial components at the swirler exit with the radial velocity component being stronger at the upstream region nearest wall 24 and the axial component being stronger at the downstream region nearest wall 23. Further, in low-load conditions the fuel entering the swirler through nozzles 25 tends to stay close to the wall 24 as it moves radially inwardly through the mixing arrangement. These flow characteristics are utilized in the embodiments of the invention hereinafter described.

Figure 4:
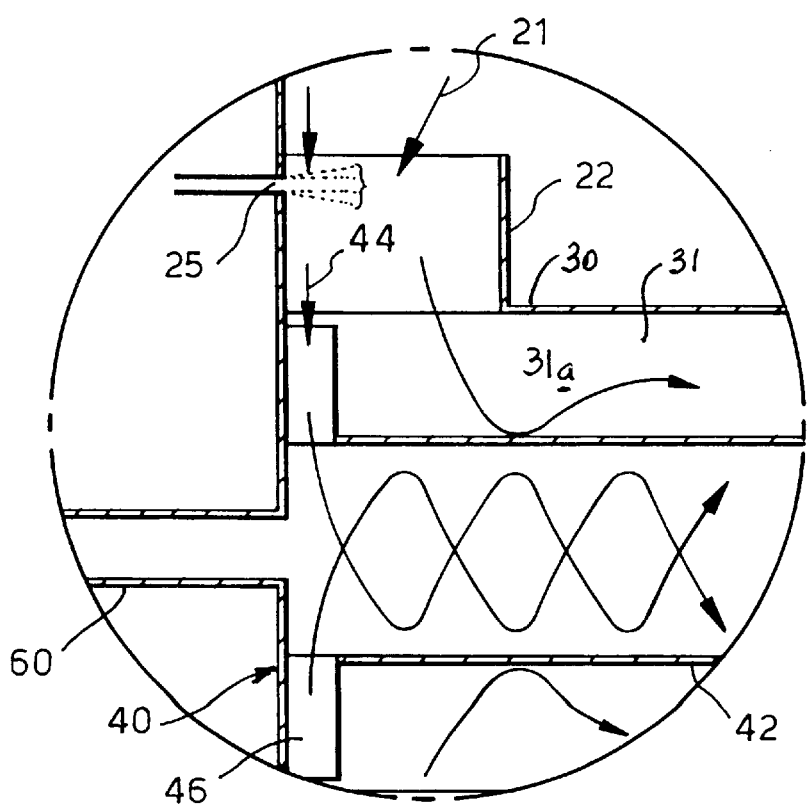
FIG. 4 shows an enlarged view of the detail (B) from FIG. 3.

FIGS. 3 and 4 shows a fuel/air mixing arrangement 20a according to a preferred embodiment of the invention. In this embodiment a flow division means in the form of an additional secondary swirler 40 is provided, which swirler 40 is positioned radially inward of a swirler 22; the radially outer swirler 22 in this embodiment constitutes a primary swirler. The inner secondary swirler 40, as shown, is of smaller axial extent (i.e. measured parallel to the central axis I—I of the combustor) than the primary swirler 22 and in any event its dimensions are such that it has a smaller effective volume for fluid flow there through than swirler 22. The swirler 40 at its radially inner extremities is attached to a tube 42 which extends through the pre-chamber 31. The tube 42 forms a second conduit means leading from secondary swirler 40 to combustion chamber 10. The annular passage 31a between the inner surface of wall 30 and the outer surface of tube 42 constitutes a first conduit means extending from the exit of primary swirler 22 to the combustion chamber 10. The mixer arrangement has a tube 60 for location of the electric igniter unit extending axially from the wall 24 in the opposite direction to the tube 42.

Figure 5:
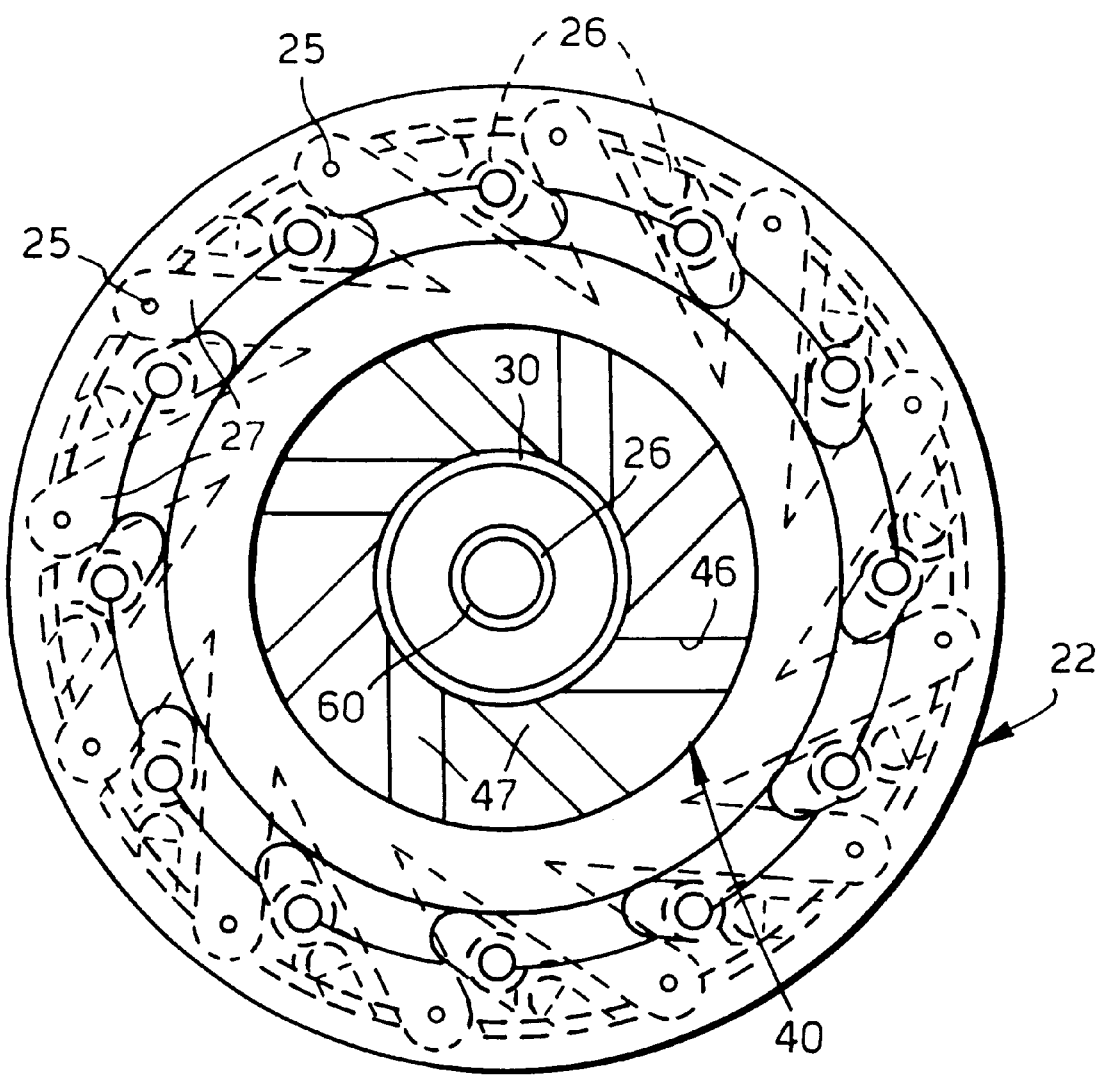
FIG. 5 shows an enlarged detailed view of the mixing arrangement of FIG. 3 viewed from the right hand side of FIG. 3.

The secondary swirler 40 may be formed with fewer passages and vanes than swirler 22. As seen in FIG. 5, which is purely exemplary of the number and arrangement of the vanes and passages in the swirler, the radially outer swirler 22 has twelve vanes 26 with twelve passages 27 each one formed between an adjacent pair of vanes 26 and the secondary swirler 40 has eight vanes 46 with eight passages 47 each one formed between an adjacent pair of vanes 46. However, other arrangements are possible, e.g., there may be an equal number of passages in each swirler and the passages may then be arranged in axial alignment.

In a low-load condition, with fuel pressure less than in the full-load condition, as explained above, fuel entering the mixing arrangement through nozzles 25 stays relatively close to wall 24. Hence, as the air flow 21 enters the primary swirler and mixes with the fuel, the resulting fuel/air mixture will also stay relatively close to wall 24 and a proportion thereof (a second proportion) as indicated by arrows 44 will, under the influence of the strong radial velocity component, enter the secondary swirler 40 while a first proportion will pass through the first conduit means 31a to the combustion chamber 10. The mixture entering swirler 40 will pass along the passages 47 into tube 42. The relative dimensions of the secondary swirler 40 and of the tube 42 are such that there will exist a dynamic regime involving the fuel/air mixture within that tube 42 similar to that which exists at full load in the larger pre-chamber 31a. The combustion characteristics of the fuel/air mixture within tube 42 will be similar to the combustion characteristics of the fuel/air mixture in pre-chamber 3a at full load and hence good combustion with a relatively low production of pollutants will result. When operating under low-load conditions, the first proportion of fuel/air mixture which does not pass through the inner swirler 40 carries proportionately less fuel and passes on the outside of tube 42 through the pre-chamber 31a into the combustion chamber 10 where the prevailing circulation system brings it into contact with the mixture exiting tube 42. The two masses mix so that the overall fuel/air ratio is stochiometric, but the flame 51 thereby produced is smaller than would be the case without the inner secondary swirler 40 and tube 42 so that the fuel density is greater and the flame stability better.

In the full load condition, the mass of fuel/air passing through the outer swirler 22 is many times greater than at low-load and because the inner swirler mass capacity is limited, its effect becomes less and less relatively as load increases. Increasingly, more of the fuel/air mass passes along the outside of the tube 42 through the first conduit means 31a and proportionately less through the second conduit means 42, so that at full load the inner swirler 40 produces relatively little effect and the system then operates more or less as a simple lean-burn system. It will be appreciated that the adjustment for changes in engine load is effected automatically by virtue of the structure described and no complicated control systems are needed to produce such effect.

Figure 6:
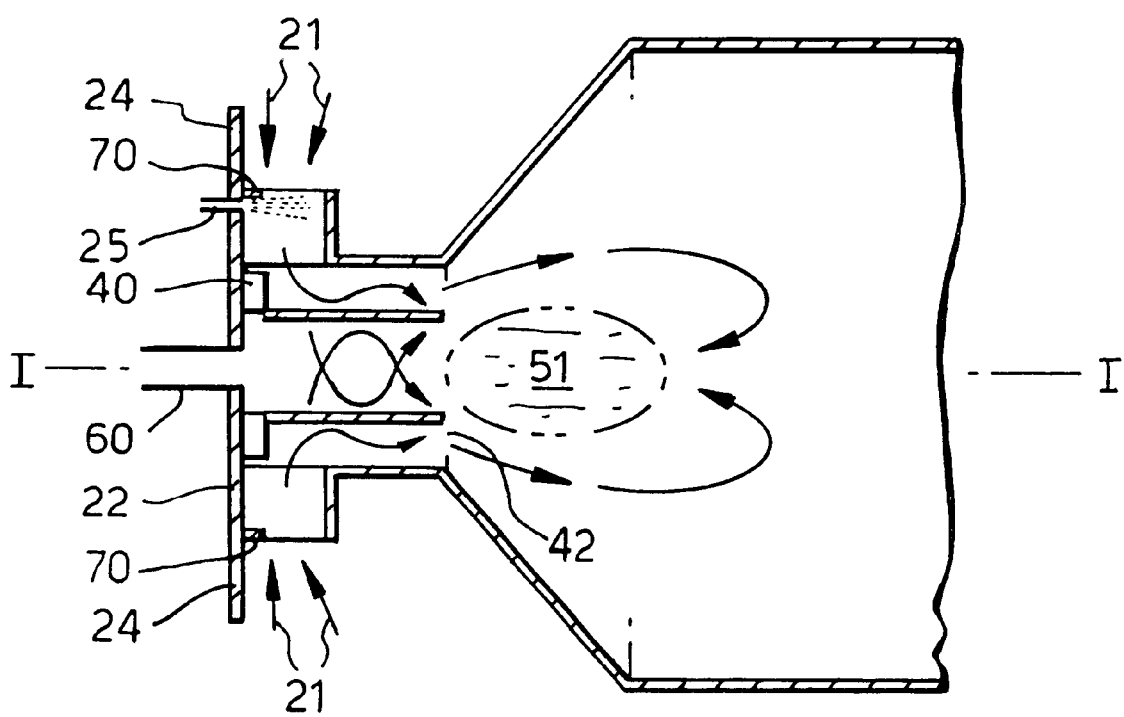
FIG. 6 shows a modification of the embodiment of FIGS. 3–5, with a shield arrangement to shield the fuel injection means.

In a further preferred embodiment as shown in FIG. 6, a sheltered zone is provided in the first swirler 22 by virtue of a shield or shields 70 provided in the vicinity of the inlets to the passages of the first swirler, e.g, the shield may be of annular form and extend around the outer circumference of primary swirler 22. The shield(s) act(s) to shield the fuel injection nozzles 25 and the fuel supply emanating therefrom from the air 21 flowing into the passages of the first swirler. This allows for the formation of fuel rich pockets of fluid adjacent the wall 24, at least when the combustion apparatus is operating at low pressure, and this assists the formation of a relatively fuel-rich mixture passing through the second swirler under low-load conditions.

I claim:

1. In a gas turbine engine having a combustion apparatus including:

A) a combustion chamber having a combustion zone, and
   B) a fuel/air mixing arrangement for delivering fuel/air mixture to the combustion zone, the mixing arrangement being of generally circular configuration about an axial centerline and comprising:
      a) primary radial inflow swirler passage means having, in flow series, radially outer air intake means, fuel injection means, and radially inner fuel/air mixture outlet means, the primary swirler passage means being operative for mixing air and fuel to form a radially inflowing fuel/air mixture;
      b) radially inward of and concentric with the primary swirler passage means, an axially extending annular conduit having first and second ends, the first end of the annular conduit communicating with the outlet means of the primary swirler passage means to receive a first proportion of the fuel/air mixture therefrom, and the second end of the annular conduit communicating with the combustion chamber to deliver the first proportion of the fuel/air mixture to a radially outer region of the combustion zone therein,
      c) radially inward of and concentric with the primary swirler passage means, secondary radial inflow swirler passage means having, in flow series, radially outer fuel/air mixture intake means and radially inner fuel/air mixture outlet means, the intake means of the secondary swirler passage means communicating with the outlet means of the primary swirler passage means to receive a second proportion of the fuel/air mixture therefrom, and
      d) radially inward of and concentric with the axially extending annular conduit and the secondary swirler passage means, an axially extending central conduit having first and second ends, the first end of the central conduit communicating with the outlet means of the secondary swirler passage means to receive the second proportion of the fuel/air mixture therefrom, and the second end of the central conduit communicating with the combustion chamber to deliver the second proportion of the fuel/air mixture to a radially inner region of the combustion zone.

2. The arrangement according to claim 1, wherein the primary swirler passage means comprises a plurality of vanes defining passages therebetween arranged to produce a flow of said mixture therethrough, said flow having a radially directed component.

3. The arrangement according to claim 2, wherein each said passage of said primary swirler passage means has at least one fuel injection orifice associated therewith for the supply of fuel to said passage.

4. The arrangement according to claim 3, and further comprising shield means to shield the at least one fuel injection orifice from air flow entering the passages of the primary swirler passage means.

5. The arrangement according to claim 1, wherein said secondary swirler passage means comprises a plurality of vanes defining passages therebetween arranged to produce a flow of said second proportion therethrough, said flow having a radially directed component.

6. The arrangement according to claim 1, wherein as the rate at which fuel enters the primary swirler passage means increases, the first proportion increases.

7. The arrangement according to claim 1, wherein the central conduit comprises a tube whose upstream end is integral with or attached to the secondary swirler passage means.

8. The arrangement according to claim 1, wherein the secondary swirler passage means has a smaller effective volume than that of the primary swirler passage means.

* * * * *